UNITED STATES PATENT OFFICE.

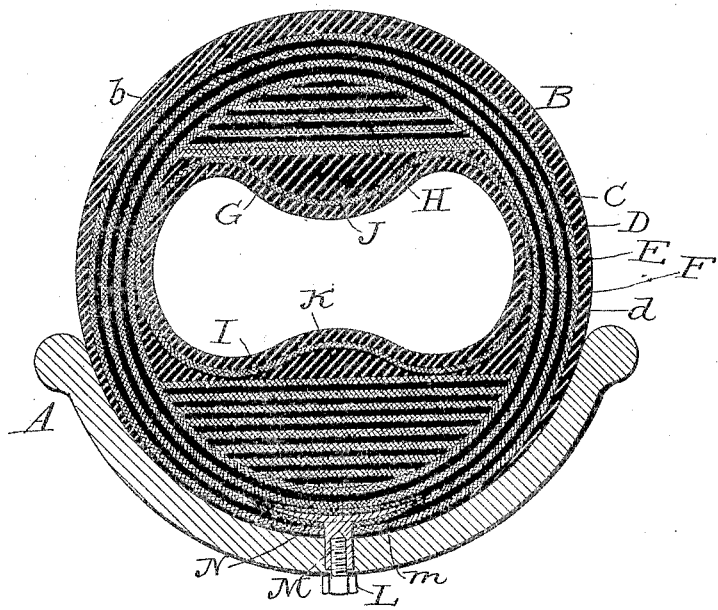
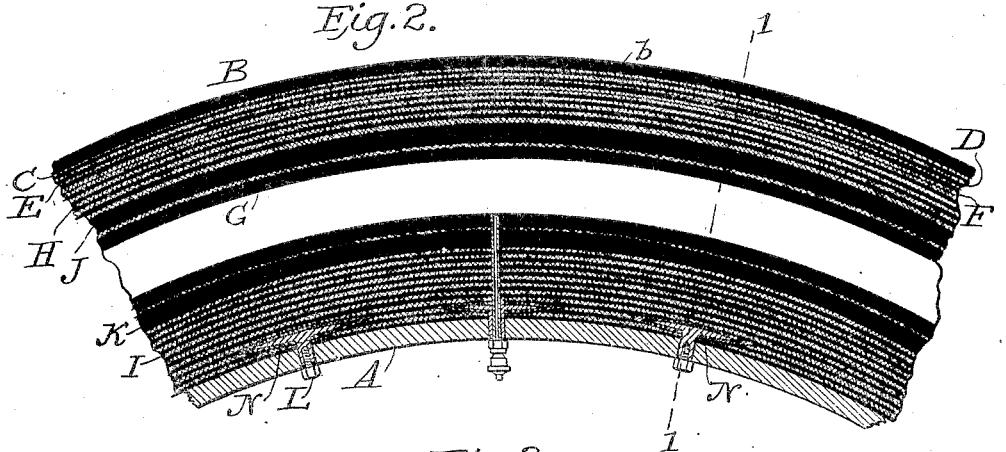
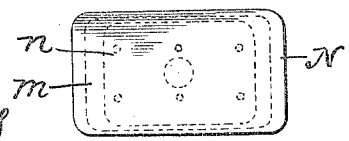

HENRY G. FISKE, OF NEW YORK, N. Y., ASSIGNOR, BY MESNE ASSIGNMENTS, TO MORTON TRUST COMPANY, TRUSTEE, A CORPORATION OF NEW YORK.

WHEEL-TIRE.

No. 802,806.

Specification of Letters Patent.

Patented Oct. 24, 1905.

Application filed April 24, 1899. Serial No. 714,160.

*To all whom it may concern:*

Be it known that I, HENRY G. FISKE, a citizen of the United States of America, and a resident of the city of New York, county of New York and State of New York, have invented certain new and useful Improvements in Wheel-Tires, of which the following is a specification.

My invention relates to inflatable or pneumatic tires for vehicle-wheels.

It consists in constructing a tire of great strength and puncture-resisting capacity, together with improved means for securely attaching the same to the rim of a wheel. These features are particularly intended to permit use of the tire even if deflated.

In the accompanying drawings, Figure 1 is a transverse sectional elevation on the line 1 1, Fig. 2. Fig. 2 is a longitudinal vertical section showing a portion of the tire, rim, and attaching devices. Fig. 3 is a detailed view of one of the metallic fasteners.

In the drawings, A is a rim of the usual crescent form, which may be of any suitable material and may also, if desired, vary somewhat in contour from that here shown by way of illustration. The tire B has an outer covering of rubber $b$, which is preferably thicker on the tread portion than at the sides or that portion which is in the rim. Beneath the outer casing occur a plurality of concentric layers of fabric and rubber, four layers C D E F of fabric being shown, between each of which is a layer $d$ of rubber, by which they are cemented together, making an exceedingly strong and tough outer casing. The said concentric layers of fabric and rubber form the outer casing and are to all intents and purposes continuous around the tire. The central portion of the tire is occupied by an inflatable tube G, which is flattened and arranged with its length crosswise of the tire. The upper portion of the interior of the casing, formed of the layers of fabric and rubber last referred to, is occupied by a body of puncture-resisting material composed of a number of transverse layers of fabric and rubber H, and a similar group of transverse layers I are arranged in the lower portion of the inner casing. With this construction the inflatable tube G is depressed from above and below and is therefore forced into the horizontal position shown, where it may assume the form of a horizontal figure 8, its extremities resting against the inner circumferential layer of the fabric F of the casing. A cushion J, formed of rubber, is preferably arranged above the middle portion of the air-tube G and a second similar cushion K under its lower middle portion, although these may be omitted. Of course in practice all of the several parts that go to make up the tire, including the outer casing, the strips or bands of fabric cushions, and an inner tube forming the impervious lining, may be closely united and formed into what is practically a single piece of material by vulcanization or other suitable means. The object of and advantage in using these cushions is that in case the tire becomes deflated and it is desired to use the vehicle the extent of collapse will be comparatively slight, so that when the tube G is deflated and the cushions J K rest upon each other there will be a sufficient mass of resilient material to serve as a cushion-tire and to prevent the edges of the rim A reaching the ground, and so avoid injury to the tire. The filling H, which is between the upper cushion J and the circumferential reinforcing layers C D E F, acts not only to keep the rim off the ground when the tire is deflated, but as a further protection against puncture.

In order to prevent injury to the inner tube G from chafing or adhesion under great pressure when used in a deflated condition, I may in some instances place in said inner tube a quantity of powdered plumbago or some lubricating liquid which will not injuriously affect the material of which the said tube is composed. This would allow the contacting surfaces to slide upon each other without injurious friction. There is, however, little liability of the opposing surfaces being injured, owing to the interior form of the tube. This is made substantially in the form of a horizontally-disposed figure 8, which brings the central portion of the opposing sides of the tube into closer position with relation to each other than any other parts of the tube, and this construction in itself provides air-spaces at either side of the central meeting portions of the tire when they are brought into contact, as upon deflation of the tube.

The tire B is secured in the rim A directly by screw-bolts L, which engage screw-threaded sockets M, extending from plates N, which are embedded in the casing of the tire.

As indicated in Fig. 3, N is a metallic plate which, as indicated in Figs. 1 and 2, is tapering in form and becomes thinner from the center where the socket M is attached, thus having an outwardly-increasing flexibility. This plate is covered with two or more thicknesses n m of rubber and fabric combined, which also decreases in thickness toward the edges, and a number of these plates are inserted between the outer reinforcing-strips D and E of the casing and are vulcanized in place, so as to become thoroughly united with and practically form a part of the tire. With this construction when the tire is placed in the rim, which has been provided with suitable apertures to receive the sockets M and the bolts L are screwed into position, the tire will be firmly secured and will at the same time be readily removable upon the withdrawal of the locking-bolts.

Without limiting myself to the exact construction shown, which may be varied in many minor particulars without departing from the invention, what I claim is—

1. A single-piece inflatable tire having a tubular fabric substantially concentric with the circular outside surface of the tire, and having an inner tubular portion the section of which shows a laterally-contracted tube, the major axis of which is arranged transversely of the tire, a body of flexible, puncture-resisting material between the upper part of the tubular portion and the tread, and a similar body of puncture-resisting material oppositely disposed thereto.

2. A pneumatic tire comprising an outer casing, a flattened inner tube arranged transversely thereof, a body of puncture-resisting material above and between the inner tube and casing, and a similar body below it, and elastic cushions between the bodies of puncture-resisting materials and the inflatable tube.

3. A continuous pneumatic tire made up of rubber and substantially circular tube of fabric and having a central air-space so formed that the major axis of the section lies transversely of the tire, projections formed integral with and extending from opposite walls of the tube forming the central air-space, said projections adapted to prevent the total collapse of the tire.

4. In combination, an inflatable, non-collapsible tire provided with an air-tube, cushions oppositely disposed whereby interior projections into the cavity are so formed as to leave air-spaces between and about them, said spaces bounded on the sides by the air-tube, whereby buffer-ridges are formed centrally of the tire to prevent total collapse.

5. An inflatable, non-collapsible continuous tire made up of fabric and rubber and provided with an air-tube, buffers coöperating with said air-tube whereby interior projections are secured, one buffer being adjacent to the tread portion of the tire and the other oppositely disposed thereto, and an air-space between and adjacent to both sides of said buffers bounded by the air-tube.

6. A continuous inflatable tire of substantially circular cross-section, provided with a tube of fabric, an inner air-tube, interior buffers arranged in contact with the walls of the air-tube, one of said buffers being adjacent to the tread of the tire, the other being adjacent to the rim, both buffers being made integral with the tube or impervious lining of the tube.

7. In combination in a tire, an outer tread portion of resilient material, layers of fabric arranged substantially concentric thereto, a central air-tube forming an elongated passage transversely disposed with relation to the tire and having projections upon its median line, a body of flexible, puncture-resisting material located between said tube and the tread portion of the tire, and a like body of material located adjacent to the seat portion of the tire.

8. In combination in a tire, a tread portion of resilient material, a series of concentric bands of fabric, an air-tube centrally arranged with relation to said fabric, layers of fabric horizontally disposed above and below said air-tube, buffer-ridges adjacent to the opposing surfaces of the air-tube and horizontally-disposed fabric, a felly for retaining and sustaining the tire as a whole, and means for securing the tire to the felly.

9. A continuous tire of substantially circular cross-section provided with an air-tube, interior buffers arranged on oppositely-disposed walls of the air-tube, one of said buffers being adjacent to the tread of the tire, the other being adjacent to the rim, both buffers being made integral with the tube or impervious lining of the tire, and bodies of flexible, puncture-resisting material between the tread of the tire and its adjacent buffer and between the seat and its buffer.

10. A non-collapsible tire comprising an outer tube and an inner tube of impervious material, fabric located intermediate of said tubes, interior buffers arranged on the inner lining, one adjacent to the tread of the tire and one oppositely disposed thereto, air-spaces between and adjacent to both sides of the buffers bounded by the inner lining, a felly conforming to and supporting the seat portion of the tire-fastening plates arranged within the seat portion of the tire and having a portion extending beyond said tire, and means coöperating with said extension and the felly for retaining the tire.

11. In combination in a non-collapsible continuous tire of substantially circular cross-section, an air-tube provided with interior buffers, one adjacent to the tread of the tire and the other adjacent to the felly, a felly for supporting said tire, tapering plates embedded in the tire and having extensions projecting beyond it, recesses in the felly adapted to receive said extensions, and means coöperating with the extensions and felly whereby the tire is locked in position.

12. A pneumatic continuous tire, circular in cross-section, provided with an air-tube and interior buffers, one being adjacent to the tread of the tire and the other adjacent to the rim, said buffers made integral with the said tube.

13. In combination in a tire, a continuous tubular outer casing, an air-tube or impervious or inflatable layer of rubber, a tube of fabric embodied in said tire disposed between the outer casing and the air-tube, buffers embodied within said tire oppositely disposed, one adjacent to the rim side and the other to the tread side, the whole permanently secured and combined leaving a central air-cavity within said tire transversely disposed and of greater dimensions near the end than the middle.

Signed by me at New York, N. Y., this 20th day of April, 1899.

HENRY G. FISKE.

Witnesses:
  FRANKLAND JANNUS,
  MACK TURK.